(12) United States Patent
Lemmer

(10) Patent No.: US 9,595,993 B1
(45) Date of Patent: Mar. 14, 2017

(54) PROTECTIVE CASE ADAPTED TO SUPPORT A SMARTPHONE

(71) Applicant: Stephan J. Lemmer, San Antonio, TX (US)

(72) Inventor: Stephan J. Lemmer, San Antonio, TX (US)

(73) Assignee: Casecorder, LLC, San Antonio, TX (US)

( * ) Notice: Subject to any disclaimer, the term of this patent is extended or adjusted under 35 U.S.C. 154(b) by 0 days.

(21) Appl. No.: 15/138,561

(22) Filed: Apr. 26, 2016

Related U.S. Application Data

(60) Provisional application No. 62/297,097, filed on Feb. 18, 2016.

(51) Int. Cl.
*H04B 1/3888* (2015.01)
*A45C 11/00* (2006.01)

(52) U.S. Cl.
CPC ............ *H04B 1/3888* (2013.01); *A45C 11/00* (2013.01); *A45C 2011/002* (2013.01)

(58) Field of Classification Search
CPC .. H04B 1/3888; H04M 1/0206; H04M 1/0208
See application file for complete search history.

(56) References Cited

U.S. PATENT DOCUMENTS

| 5,655,848 | A  | * | 8/1997 | Catron | ............... | F16C 11/0604 |
|---|---|---|---|---|---|---|
|  |  |  |  |  |  | 403/124 |
| 7,447,527 | B2 |  | 11/2008 | Lin et al. |  |  |
| 2011/0245609 | A1 | * | 10/2011 | Laser | ................ | A61B 1/00052 |
|  |  |  |  |  |  | 600/109 |
| 2013/0079070 | A1 |  | 3/2013 | Losiewicz |  |  |
| 2013/0092562 | A1 | * | 4/2013 | Wyner | ................... | A45C 11/00 |
|  |  |  |  |  |  | 206/45.23 |
| 2014/0031095 | A1 | * | 1/2014 | Herrera | ............... | H04M 1/0206 |
|  |  |  |  |  |  | 455/575.3 |
| 2014/0116895 | A1 | * | 5/2014 | Ellenburg | ............ | H04B 1/3888 |
|  |  |  |  |  |  | 206/37 |
| 2014/0152034 | A1 |  | 6/2014 | Tussy |  |  |

* cited by examiner

*Primary Examiner* — Tuan Pham
(74) *Attorney, Agent, or Firm* — Matthew J. Lattig; Charter IP, LLC

(57) ABSTRACT

A protective case for a smartphone is described herein. The case may include a first frame part, and a second frame for retaining the smartphone therein. One of the first and second frame part has a ball formed at one end thereof, and the other includes a socket adapted to fixedly retain the ball therein. The case further includes a threaded insert attachable to the case for receiving a tripod mount, and an elastomeric element. One of the frame parts is pivotable relative to the other via the ball and socket between open and closed states spanning up to 90 degrees, with one of the two frame parts further rotatable 360 degrees about its own longitudinal axis thereof via the ball and socket. The elastomeric element bears against the ball to provide friction so as to prevent undesired rotation of one frame part relative to the other in all degrees of freedom.

19 Claims, 3 Drawing Sheets

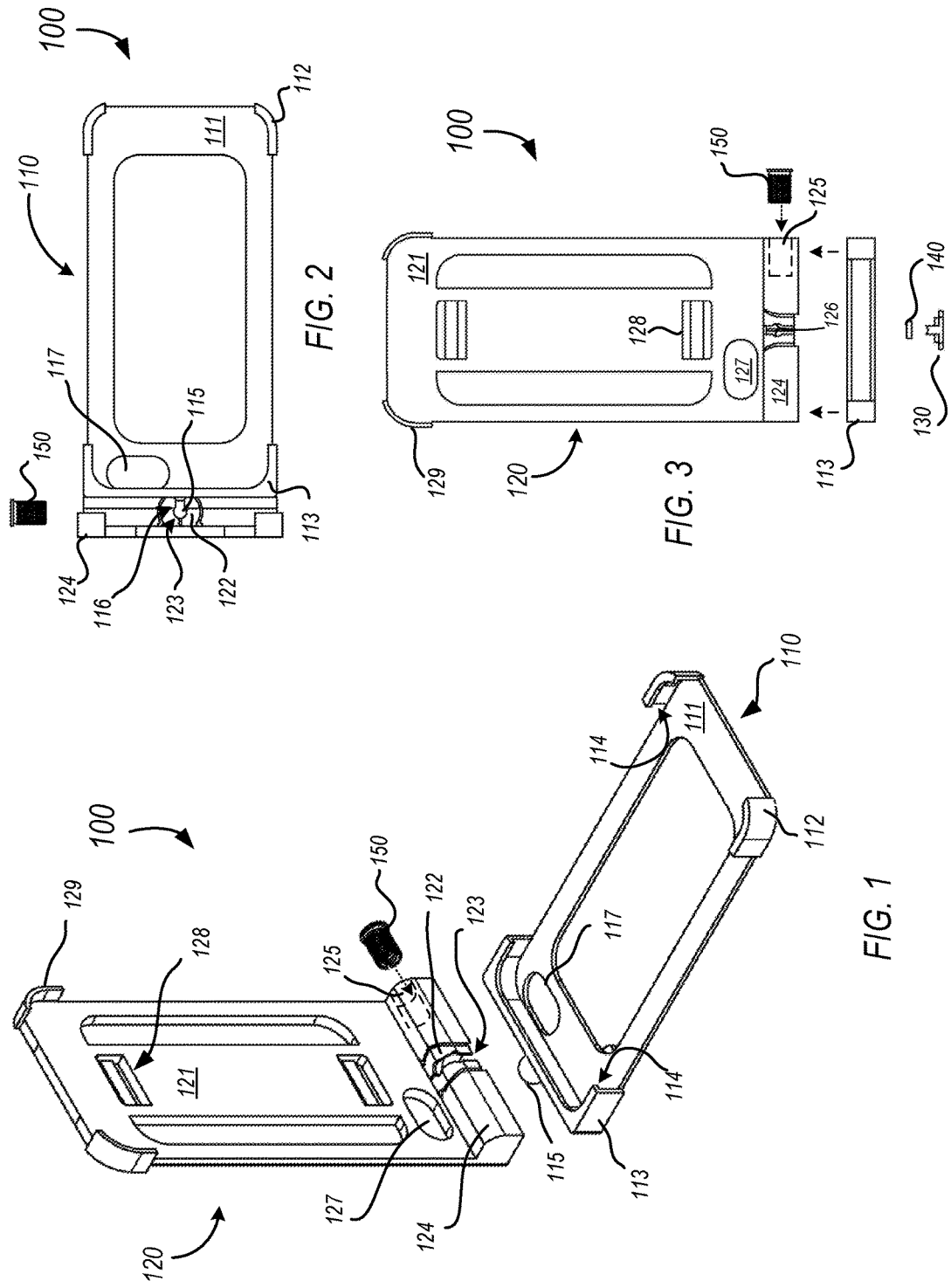

PROTECTIVE CASE ADAPTED TO SUPPORT A SMARTPHONE

BACKGROUND

Field

The example embodiment in general is directed to a case for supporting a smartphone therein, more particularly to a protective case designed to alter the ergonomics of the smartphone to improve its use as a handheld or tripod-mounted video recording device, and to provide a secondary functionality as a "kickstand" for still photography, video viewing, and other related tasks.

Related Art

A smartphone may be understood as a combination cell-phone and handheld computer that is often viewed as creating the greatest tech revolution since the Internet. A smartphone can essentially do everything a personal computer can do, and because of its mobility, much more. Although screen size may be a limitation, the increasingly higher resolutions make viewing pleasurable, and voice recognition can eliminate a fair amount of typing.

In general, a smartphone combines the functions of a cellphone with e-mail and Web, music and movie player, camera and camcorder, GPS navigation, voice dictation for messaging and a voice search for asking questions about anything. Significantly more personal than a personal computer, a smartphone is generally within reach no matter where one is.

Cellular technology has repeatedly shown its ability to develop smartphones to replace a variety of general use sensing and computing devices, such as still and video cameras and the functions noted above. While this substantially reduces the number of devices a person must carry, this "one size fits all" approach often may lead to suboptimal ergonomics in particular use cases. In many cases, a user may find his primary use case neglected, and seek methods or devices to customize his experience.

SUMMARY

An example embodiment of the present invention is directed to a protective case for a smartphone. The case may include a first frame part, and a second frame part for retaining the smartphone. One of the first and second frame parts has a ball integrally formed at one end thereof, and the other of the first and second frame parts includes a socket that is adapted to fixedly retain the ball therein. The case further includes a threaded insert attachable to the case for receiving a tripod mount, a cap, the cap including a crescent-shaped extrusion to prevent rotation of one of the first and second frame parts relative to the other frame part beyond a 90 degree maximum angle, and an elastomeric element. The cap is adapted to hold the elastomeric element in contact against the ball so as to prevent undesired rotation of one of the first and second frame parts relative to the other frame part.

Another example embodiment is directed to a protective case adapted to support a smartphone. The case includes a first frame, and a second frame part adapted to retain the smartphone therein. The first frame part includes a recess formed in a side surface at an end thereof and has a ball integrally formed at the same end thereof, and the second frame includes a socket formed thereon at one end thereof that is adapted to fixedly retain the ball therein. The socket further includes a slot formed therethrough that is adapted to limit relative motion between the first and second frame parts to two degrees of freedom. The case further includes a cap holding an elastomeric element in place and in contact against the ball to provide friction so as to prevent undesired rotation of one of the first and second frame parts relative to the other, the cap further including an elongate, protruding tab element adapted to line up with the recess in the first frame part.

Another example embodiment is directed to a protective case adapted to support a smartphone. The case includes a first frame and a second frame part adapted to retain the smartphone therein. One of the first and second frame parts has a ball formed at one end thereof, and the other of the first and second frame parts includes a socket formed thereon at one end thereof that is adapted to fixedly retain the ball therein. One of the first and second frame parts is pivotable about the ball and socket relative to the other frame part. The case further includes a elastomeric element in contact against the ball to provide friction so as to prevent undesired rotation of one of the first and second frame parts, and a cap adapted to hold the elastomeric element in contact against the ball. The cap further includes an extruded, circular cut formed therein that has a depth which forms a central raised feature around which the elastomeric element fits, whereby the depth of the cut is adapted to be varied so as to vary friction generated by the elastomeric element on the ball.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 1 is a perspective view in exploded form of a protective case for supporting a smartphone therein, in accordance with an example embodiment.

FIG. 2 is a front plan view of the case shown in FIG. 1 in a closed state with insert shown in space thereto.

FIG. 3 is a rear plan view of the case shown in FIG. 1 in a closed state with elastomeric element and portion of first frame part shown in space thereto.

DETAILED DESCRIPTION

Figure 5:
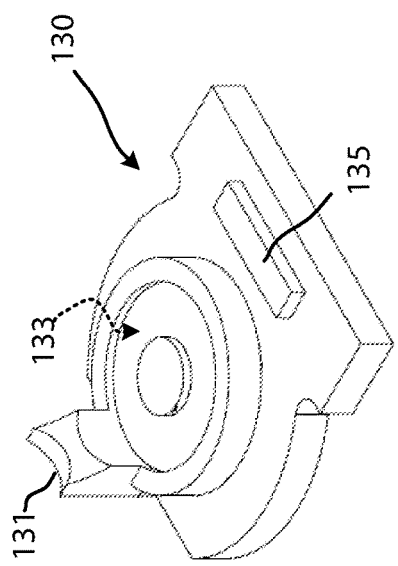
FIG. 5 is a perspective view of a cap of the case shown in FIG. 1.
Figure 6:
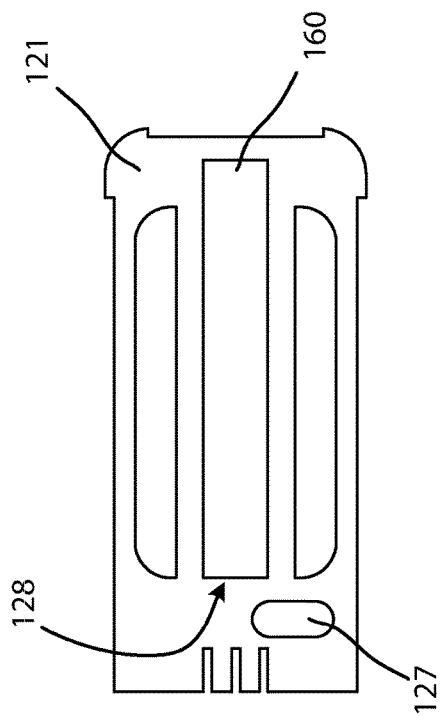
FIG. 6 is a rear plan view of the case to illustrate the strap in more detail.
Figure 4:
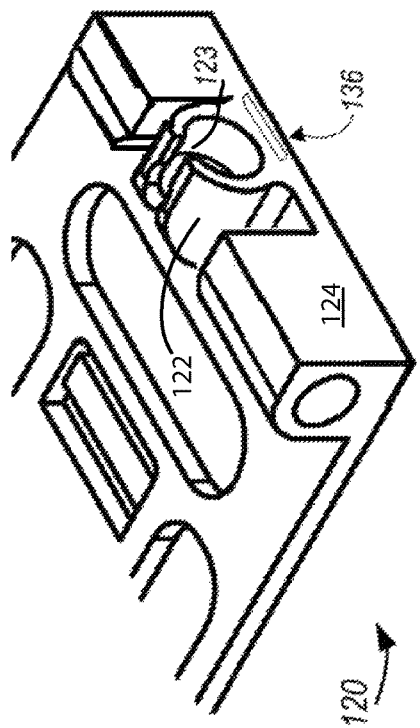
FIG. 4 is an enlarged view of a portion of the second frame part to illustrate constituent components thereof in further detail.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

The example embodiment hereafter is directed to a protective case 100 designed to alter the ergonomics of a cellular or wireless smartphone 200 in order to improve its use as a handheld or tripod-mounted video recording device. Additionally, the example case 100 provides secondary functionality as a "kickstand" for still photography, video viewing, and other related tasks. Further, the case 100 provides incidental protection to the smartphone 200 against drops and other everyday hazards.

In general, and referring now to FIGS. 1-6, the example protective case 100 includes a first frame part 110 serving as a handle, a second frame part 120 designed to hold the smartphone 200 therein, a cap 130, an elastomeric element 140 which provides friction to prevent undesired rotation in all degrees of freedom, and a threaded insert 150 adapted to interface to a standard tripod mount. The purpose of the first frame part 110 is as a handle for a user 250, and to connect the smartphone 200 to the remaining components of case 100. The first frame part 110 includes a frame body 111 on which is integrally formed a pair of corner walls 112 at one end and a base wall 113 integrally formed in the frame body 111 at the other end. Each wall 112, 113 includes an overhang or retaining lip 114. The walls 112, 113 with retaining lips 114 are configured so as to hold the smartphone 200 in place within the case 100.

The first frame part 110 includes a ball 115 attached thereto via an integrally formed stalk 116. Although merely for purposes of explanation only the example embodiment describes the ball 115 as being formed on the first frame part 110, ball 115 may be formed on the second frame part 120 instead. The ball 115 acts to facilitate motion of the first frame part 110 relative to the second frame part 120. Frame body 111 further includes one or more cutouts 117. The cutout 117 is provided so as to permit use of a camera lens and/or lights. In an example, the location and presence of the cutout 117 may be determined based on the smartphone 200 model. Additional cutouts 117 may be formed in the frame body 111 in order to accommodate accessories such as headphones, speakers, charge ports, USB ports, and the like.

Polycarbonate, with the ability to resist breaking and protect whatever is inside it, is one example material usable to construct the smartphone 200 case 100 inclusive of some or all of its constituent structural components (e.g., first frame part 110, second frame part 120, and cap 130). Polypropylene, which can easily be injected into molds to form different shapes, is another suitable material suitable due to its ease of manufacture. Another possible material for the case 100 may be polyurethane, which can be hard or soft, or alternatively a recycled plastic such as recycled PET. Further, the example case 100 may be composed of a blend or composite of any of the above plastics.

These aforementioned materials are merely exemplary; the case 100 may further be composed of, in the alternative, silicone, a light metal material such as aluminum, carbon fiber, leather/synthetic leather, natural/synthetic rubber, bamboo or other wood types such as cherry and redwood, and composites of one or more of these materials. Some people prefer wood cases because they are a more natural material than plastic or silicone.

The purpose of the second frame part 120 is to provide a gripping surface for the user while the case 100 is manipulated up to and held in its 90 degree position, i.e., with the first frame part 110 opened and in approximately a perpendicular orientation relative to the second frame part 120. Additionally, the second frame part 120 provides a secondary kickstand functionality. Further, and as will be shown in more detail hereafter with regard to the example use cases, the second frame part 120 is adapted to have two positions for stowage, one for screen protection (screen 205 turned inward, facing the inner surface of frame body 110) and another for standard smartphone 200 use within case 100 (screen 205 facing away from inner surface of frame body 111).

The second frame part 120 may include a frame body 121 having an integrally formed or otherwise attached socket 122, the socket 122 further having a slot 123 formed therethrough, a pair of shoulders 124 (or in another alternative construction, a single shoulder 124 spanning the width of second frame part 120), and a hole 125 adapted to receive the threaded insert 150. Although merely for purposes of explanation only the example embodiment describes the socket 122 as being formed on the second frame part 120, in a configuration where ball 115 is formed on the first frame part 110, socket 122 would be formed on the first frame part 110 instead. In an example, hole 125 may accommodate a ¼-20 heat-set threaded insert 150. The socket 122 is adapted to hold the ball 115 and allow for movement of either frame part 110, 120 relative to the other. The slot 123 formed in socket 122 is designed so as to limit the relative motion between the frame parts 110, 120 of the case 100 to two (2) degrees of freedom. The width of the slot 123 is slightly thinner than the stalk 116 which holds the ball 115 in place on frame body 111, requiring a slight deformation of the material to rotate between the 0 and 90 degree positions.

Detents 126, as shown best in FIG. 3, are provided at the 0 and 90 degree positions so as to hold the respective frame parts 110, 120 of the case 100 in these positions. Detents 126 prevent accidental or incomplete rotation of first frame part 110. The shoulders 124 are adapted to hold the smartphone 200 steady and reduce stress on the ball 115 and socket 122 when the case 100 is in its perpendicular (90°) or "open"

state. Further, the shoulders 124 protect the ball 115 and socket 122 from damage due to drops of the case 100.

Second frame part 120 additionally includes one or more cutouts 127, a pair of slots 128 and a pair of extrusions 129. As previously described, the cutout(s) 127 permit use of a camera and light. Additional cutouts 127 may be formed in the frame body 121 in order to accommodate accessories such as headphones, speakers, and the like. The slots 128 are provided for accommodating a carry strap 160, permitting the strap 160 to remain fully on the outside of the case 100 so as not to interfere with the smartphone 200. The extrusions 129 are provided to facilitate capture of the second frame part 120 within the first frame part 110; namely, extrusions 129 are captured within the corner walls 112 of frame body 111 so that the frame body 121 of the second frame part 120 nests flush within frame body 111 of the first frame part 110, with the retaining lips 114 of frame body 111 maintaining case 100 closed via a snap fit, frictional interface. Extrusions 129 also prevent undesired rotation of the first frame part 110 in the closed position.

The cap 130 is configured so as to hold the ball 115 captive in the socket 122, to prevent over-rotation, and to hold the elastomeric element 140 against the ball 115. Elastomeric element 140 in an example may be embodied as a washer made of hard plastic such as ABS or of a rubber/synthetic rubber material. As best shown by FIG. 5, cap 130 includes an integrally-formed, crescent-shaped extrusion 131 to prevent rotation of the first frame part 110 relative to the second frame part 120 beyond the 90 degree maximum. As cap 130 holds the friction elastomeric element 140 in place, the cap 130 further includes an extruded, circular cut 133 (dotted line) formed therein having a depth which forms a central, raised surface 134 around which fits elastomeric element 140. As cut 133 is adapted to receive the elastomeric element 140, the depth of the cut 133 adapted to be varied so as to vary the friction generated by the elastomeric element 140 on the ball 115. An elongate, protruding tab element 135 integrally formed in cap 130 is adapted to line up with an opposite recess 136 (see FIG. 4) formed in the side surface end of the frame body 121 of the second frame part 120 to ensure correct assembly, thus serving as an interface between the cap 130 and second frame part 120.

Accordingly, in the design of case 100, one axis of rotation is held by friction (created between elastomeric element 140 and ball 111), and the other axis of rotation is held by a mechanism (one of the first or second frame parts 110, 120, depending on which is moved, actuated or otherwise rotated relative to the other) as the user manipulates case 100 between one of a first (i.e., "open" or perpendicular (0 to a 90° maximum) position, and closes again once it reaches a second ("closed" or parallel (0°)) position in which the second frame part 120 is flush aligned within the first frame part 110.

Figure 7:
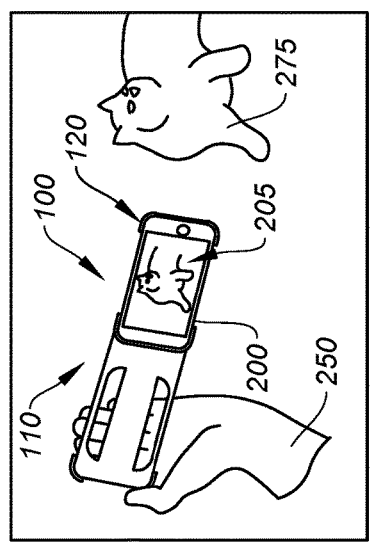
FIG. 7 is a plan view of the case to show movement from a closed to an open stats thereof, and shows a handheld configuration for the case.

FIGS. 7-10 are provided to describe certain uses case for the example embodiment. As shown in FIG. 7, a user 250 is holding the case 100 in an open state, viewing the screen 205 of the smartphone 200 so as to take a picture or video of an object 275, in this case a cat.

The action of placing case 100 in the open position comprises the user 250 inserting their hand between the strap 160 and an outer surface of first frame part 110. By grasping second frame part 120 with their other hand, the smartphone 200 within second frame part 120 can be rotated outward and away from the first frame part 110 towards a fully open, 90° position. FIG. 7 shows what may be understood as a handheld configuration for taking pictures, video and the like.

Figure 8:
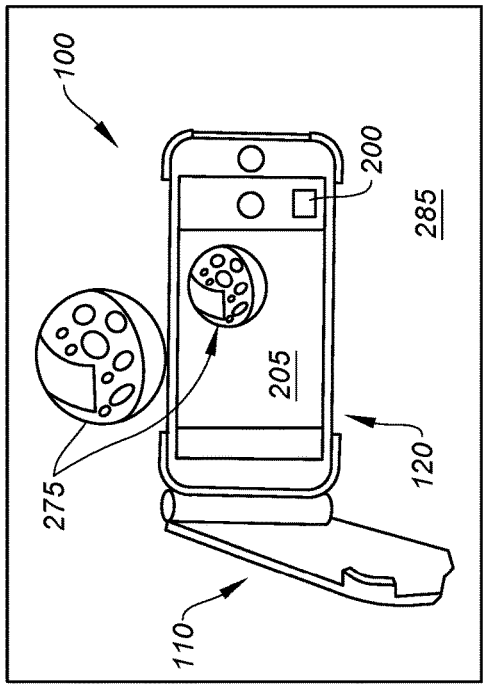
FIG. 8 is a plan view illustrating a static configuration of the case in an open state.
Figure 10:
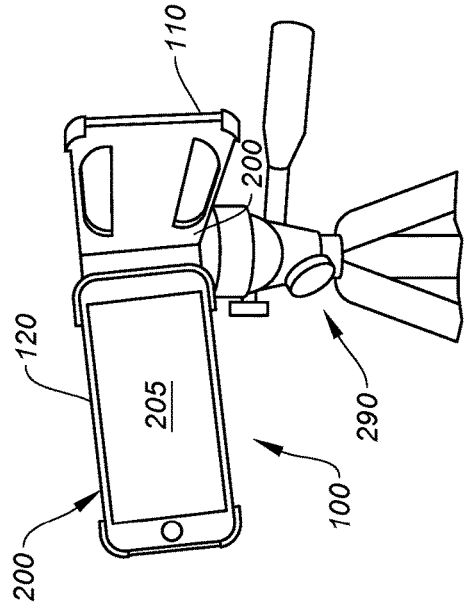
FIG. 10 is a rear plan view of a tripod with the case attached thereto according to the example embodiment.
Figure 9:
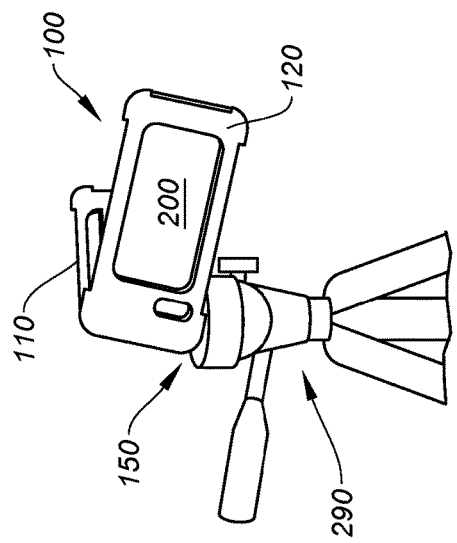
FIG. 9 is a front plan view of a tripod with the case attached thereto according to the example embodiment.

A static position of the case 100 in the open position on a planar surface 285 (table) is shown in FIG. 8 (with screen 205 facing inward toward the inner surface of first frame part 110). If so configured, remote video and pictures may be taken using the smartphone 200 from this static configuration. FIGS. 9 and 10 illustrate a front and rear plan view respectively of a tripod 290 with the case 100 mounted thereon to describe another static configuration for case 100. In FIG. 9 the arrow at 150 indicates where the threaded insert 150 engages a portion of tripod 290.

Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention may include description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

I claim:

1. A protective case adapted to support a smartphone therein, comprising:
   a first frame part serving as a handle for a user of the case,
   a second frame part designed to fixedly retain the smartphone therein, one of the first and second frame parts having a ball formed at one end thereof, and the other of the first and second frame parts including a socket formed thereon at one end thereof that is adapted to fixedly retain the ball therein,
   a threaded insert attachable to the case for receiving a tripod mount, a cap, the cap including a crescent-shaped extrusion to prevent rotation of one of the first and second frame parts relative to the other frame part beyond a 90 degree maximum angle, and an elastomeric element, the cap adapted to hold the elastomeric element in contact against the ball so as to prevent undesired rotation of one of the first and second frame parts relative to the other frame part.

2. The case of claim 1, wherein the cap further includes:
an extruded, circular cut formed therein and having a depth which forms a central raised feature to capture the elastomeric element, whereby
the depth of the cut is adapted to be varied so as to vary the friction generated by the elastomeric element on the ball.

3. The case of claim 1, wherein
one of the first and second frame parts include a recess formed in a side surface at an end thereof, and
the cap includes an elongate, protruding tab element adapted to line up with the recess.

4. The case of claim 1, further comprising a strap attached to an outer surface of one of the first and second frame parts and adapted to receive a hand of a user therethrough.

5. The case of claim 1, wherein one of the first and second frame parts further includes:
a frame body,
a pair of corner walls formed on the frame body in spaced relation at one end thereof,
a base wall formed on the frame body at the other end, each wall including a retaining lip, the walls with lips adapted to hold the smartphone in place within the case.

6. The case of claim 1, wherein one of the first and second frame parts further includes:
a frame body, and
one or more shoulders on the frame body in spaced relation at one end thereof, the one or more shoulders adapted to hold the smartphone steady while reducing stress on the ball and socket with the case in its open state.

7. The case of claim 1, wherein the socket further includes a slot formed therethrough that is adapted to limit relative motion between the first and second frame parts to two degrees of freedom.

8. The case of claim 7, wherein the slot has a width smaller than that of a stalk connecting the ball to one of the first and second frame parts, the material of the slot subject to deformation to accommodate pivoting of one frame part relative to the other between the fully open and closed states.

9. The case of claim 7, wherein one of the first and second frame parts includes a pair of detents formed in spaced, mirror facing relation to one another along the slot in the socket, the detents adapted to hold the respective frame parts of the case in the 0 and 90 degree positions.

10. The case of claim 1, wherein one of the first and second frame parts further includes a hole formed therein that is adapted to receive the threaded insert.

11. The case of claim 1, wherein each of the first and second frame parts include one or more cutouts for accommodating one or more of a camera lens, light, headphones, speakers, charge ports, USB ports, and the like.

12. A protective case adapted to support a smartphone therein, comprising:
a first frame part, and
a second frame part adapted to retain the smartphone therein, the first frame part including a recess formed in a side surface at an end thereof and having a ball formed at the same end thereof, the second frame part including a socket formed thereon at one end thereof that is adapted to fixedly retain the ball therein, the socket further including a slot formed therethrough that is adapted to limit relative motion between the first and second frame parts to two degrees of freedom, and
a cap holding an elastomeric element in place and in contact against the ball to provide friction so as to prevent undesired rotation of one of the first and second frame parts relative to the other, the cap further including an elongate, protruding tab element adapted to line up with the recess in the first frame part.

13. The case of claim 12, wherein the slot has a width smaller than that of a stalk connecting the ball to the first frame part, the material of the slot subject to deformation to accommodate pivoting of one frame part relative to the other between a fully open and a fully closed state.

14. The case of claim 12, wherein the second frame part further includes a pair of detents formed in spaced, mirror facing relation to one another along the slot formed in the socket, the detents adapted to hold the respective frame parts of the case in a 0 degree or fully closed position and a 90 degree or fully open position.

15. A protective case adapted to support a smartphone therein, comprising:
a first frame part,
a second frame part adapted to retain the smartphone therein, one of the first and second frame parts having a ball formed at one end thereof, the other frame part including a socket formed thereon at one end thereof that is adapted to fixedly retain the ball therein, one of the first and second frame parts adapted to be pivotable about the ball and socket relative to the other frame part,
a elastomeric element bearing against the ball to provide friction so as to prevent undesired rotation of one of the first and second frame parts relative to the other frame part, and
a cap adapted to hold the elastomeric element bearing against the ball, the cap further including an extruded, circular cut formed therein that has a depth which forms a central raised feature around which the elastomeric element fits, whereby the depth of the cut is adapted to be varied so as to vary friction generated by the elastomeric element on the ball.

16. The case of claim 15, wherein the cap further includes a crescent-shaped extrusion to prevent rotation one of the first and second frame parts relative to the other frame part beyond a 90 degree maximum angle.

17. The case of claim 15, wherein
the second frame part includes a recess formed in a side surface at an end thereof, and
the cap includes an elongate, protruding tab element adapted to line up with the recess.

18. The case of claim 1, wherein one of the first and second frame parts is pivotable relative to the other via the ball and socket between a closed state at 0 degrees towards an open state at 90 degrees.

19. The case of claim 1, wherein one of the first and second frame parts is further rotatable 360 degrees about its own longitudinal axis thereof via the ball and socket.

* * * * *